(12) United States Patent
Klein et al.

(10) Patent No.: US 7,010,529 B2
(45) Date of Patent: *Mar. 7, 2006

(54) METHOD AND MECHANISM FOR DEPENDENCY TRACKING AT LOW GRANULARITY LEVELS

(75) Inventors: Jonathan D. Klein, Redwood City, CA (US); Amit Ganesh, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/961,963

(22) Filed: Oct. 8, 2004

(65) Prior Publication Data

US 2005/0050109 A1    Mar. 3, 2005

Related U.S. Application Data

(62) Division of application No. 09/775,234, filed on Jan. 31, 2001, now Pat. No. 6,804,672.

(51) Int. Cl.
G06F 17/30    (2006.01)
(52) U.S. Cl. .................. 707/8; 707/102; 707/103 R; 707/104.1; 707/201; 709/205
(58) Field of Classification Search .............. 707/3, 707/4, 8, 10, 100, 202, 102, 104.1, 203; 709/205, 709/223, 232, 248; 711/112, 113, 120, 135; 714/4, 20
See application file for complete search history.

(56) References Cited

U.S. PATENT DOCUMENTS

| | | | | |
|---|---|---|---|---|
| 5,104,685 A | * | 4/1992 | Takahashi et al. | 427/577 |
| 5,408,653 A | * | 4/1995 | Josten et al. | 707/8 |
| 5,577,240 A | * | 11/1996 | Demers et al. | 707/8 |
| 5,737,601 A | * | 4/1998 | Jain et al. | 707/201 |
| 5,761,660 A | * | 6/1998 | Josten et al. | 707/8 |
| 5,781,912 A | * | 7/1998 | Demers et al. | 707/202 |
| 5,794,229 A | * | 8/1998 | French et al. | 707/2 |
| 5,806,076 A | * | 9/1998 | Ngai et al. | 707/203 |
| 5,870,760 A | * | 2/1999 | Demers et al. | 707/201 |
| 5,870,761 A | * | 2/1999 | Demers et al. | 707/201 |
| 5,940,826 A | * | 8/1999 | Heideman et al. | 707/8 |
| 6,349,310 B1 | * | 2/2002 | Klein et al. | 707/200 |
| 6,397,227 B1 | * | 5/2002 | Klein et al. | 707/200 |
| 6,434,568 B1 | * | 8/2002 | Bowman-Amuah | 707/103 R |
| 6,442,748 B1 | * | 8/2002 | Bowman-Amuah | 717/108 |
| 6,493,701 B1 | * | 12/2002 | Ponnekanti | 707/2 |
| 6,496,850 B1 | * | 12/2002 | Bowman-Amuah | 709/203 |
| 6,560,606 B1 | * | 5/2003 | Young | 707/100 |
| 6,701,345 B1 | * | 3/2004 | Carley et al. | 709/205 |

OTHER PUBLICATIONS

Almeida, et al., "Panasync: Dependency tracking among file copies", ACM, pp. 7-12, 1997.*
Baldoni, et al., "A Communication-Induced Checkpointing Protocol that Ensures Rollback-Dependency Trackability", IEEE, pp. 68-77, 1997.*
Baldoni, et al., "Rollback-Dependency Trackability: Visible Characterizations", ACM, pp. 33-42, 1999.*

(Continued)

*Primary Examiner*—Shahid Alam
(74) *Attorney, Agent, or Firm*—Bingham McCutchen LLP

(57) ABSTRACT

A method and mechanism for tracking dependencies at low granularity levels in a database system is disclosed. An embodiment utilizes commit time values at low granularity levels which are associated with structures in a database system. Those associated commit time values are used to compute dependency values.

18 Claims, 7 Drawing Sheets

OTHER PUBLICATIONS

Damani, et al, "Optimistic Distributed Simulation Based on Transitive Dependency Tracking", IEEE, pp. 90-97, 1997.*

Elnozahy, "On the Relevance of Communication Costs of Rollback-Recovery Protocols", ACM, pp. 74-79, 1995.*

Garcia, et al., "On the Minimal Characterization of the Rollback-Dependency Trackability Property", IEEE, pp. 342-349, 2001.*

Louboutin, et al., "Comprehensive Distributed Garbage Collection by Tracking Causal Dependencies of Relevant Mutator Events", IEEE, pp. 516-525, 1997.*

Sadri, "Integrity Constraints in the Information Source Tracking Method", IEEE, pp. 106-119, 1995.*

Sreenivas, et al., "Independent Global Snapshots in Large Distributed Systems", IEEE, pp. 462-467, 1997.*

* cited by examiner

Dependent SCN Table

| Transaction | dependent SCN | Transaction commit time |
|---|---|---|
| T1 | 0 | 5 |
| T2 | 0 | 10 |
| T3 | max (5,10) = 10 | 15 |
| T4 | 0 | 20 |
| T5 | max (15, 20) = 20 | 25 |

FIG. 3

METHOD AND MECHANISM FOR DEPENDENCY TRACKING AT LOW GRANULARITY LEVELS

CROSS REFERENCED AND RELATED APPLICATIONS

This invention is a divisional of co-pending application Ser. No. 09/775,234, titled "Method and Mechanism for Dependency Tracking" filed on Jan. 31, 2001 now U.S. Pat. No. 6,804,672.

BACKGROUND OF THE INVENTION

1. Field of the Invention

The invention relates to computer systems, and more particularly to dependency tracking in a database system.

2. Background

The present invention pertains to dependency tracking in a database system. "Dependency" in a database system refers to the ordering in which operations may be performed against data items in the database. If a first operation is applied against a data item, and a second operation against that data item can only be applied after the first operation has been completed, then the second operation is said to be dependent upon the first operation. For example, consider a database statement to "UPDATE" a data item. That statement can only be processed after a prior statement to "INSERT" that data item into a database has completed (since the data item does not exist until the completion of the INSERT statement). Thus, the UPDATE statement in this example is dependent upon the INSERT statement.

A logical unit of work in a database system that comprises one or more database statements is often referred to as a transaction. When a database system executes a transaction, the transaction may perform a data operation upon a data item that was written or updated in response to the execution of previous transaction(s). Consequently, the results returned by the database system in response to executing any given transaction are dictated by changes made by a set of previously executed transactions. With respect to affected data items, the latest transaction is thus dependent upon previous transactions that have operated upon those data items.

For many reasons, it is useful to track dependencies between transactions in a database system. For example, assume that two transactions, TXA and TXB, must be reapplied to the database. This may occur, for example, if the database is recovering from a prior database failure and transactions are being reapplied to set the database back to its pre-failure state. As an another example, tracking dependencies is useful in determining the order in which transactions may be applied or propagated when replicating a database.

Dependency information can be extracted from log files in a database system. However, extracting and analyzing log files to determine/track dependencies is a very expensive to perform. Therefore, it is clearly desirable to provide a method and mechanism to track dependencies in a database statement.

SUMMARY OF THE INVENTION

The present invention is directed to a method and mechanism for tracking dependencies at low granularity levels in a database system. Further aspects, objects, and advantages of the invention are described below in the detailed description, drawings, and claims.

BRIEF DESCRIPTION OF THE DRAWINGS

The accompanying drawings are included to provide a further understanding of the invention and, together with the Detailed Description, serve to explain the principles of the invention.

FIG. 3 shows a table of dependent SCN values corresponding to the example sequence of database statements.

DETAILED DESCRIPTION

Figure 1:
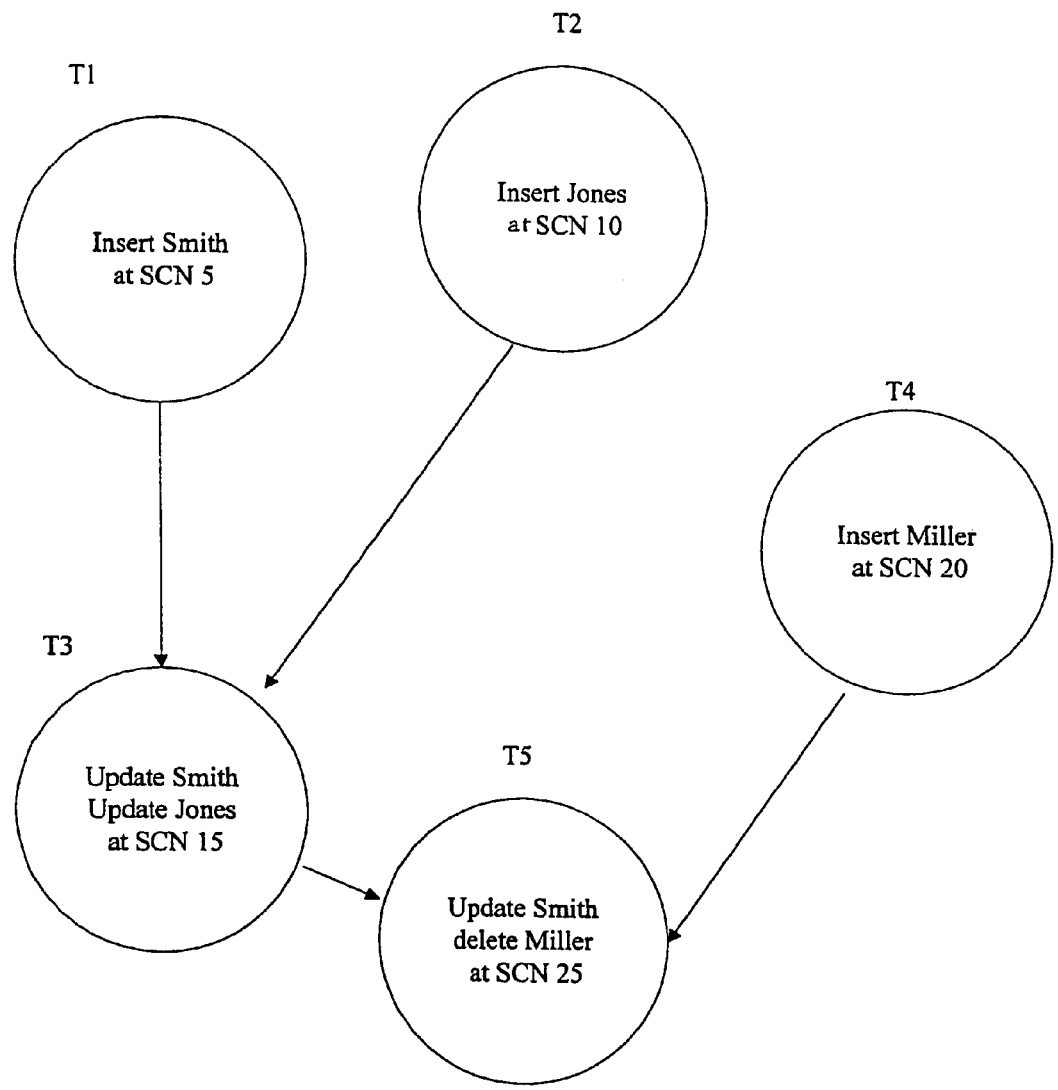
FIG. 1 illustrates a dependency tree for the example sequence of database statements.

The present invention is directed to a method and mechanism for tracking dependencies at low granularity levels in a database system. The detailed description of the disclosed embodiment is directed to dependency tracking of changes to database tables at the row level, based upon dependency across transactions. However, the principles presented here are equally applicable to dependency tracking at other granularity levels and for database changes within transactions also, and thus the scope of the invention is not to be limited to the disclosed embodiment shown herein.

As stated above, a logical unit of work in a database system that comprises one or more database statements is often referred to as a transaction. In many database systems, a transaction begins when its first executable statement is encountered, e.g., a structured query language ("SQL") statement that queries or modifies a database table. "Committing" a transaction normally means that a transaction makes permanent the changes performed by database statements within the transaction (although the database arts include techniques to rollback even committed transactions). For each transaction that commits, an internal database tracking number can be assigned to the transaction that relates to the time at which the commit occurs. This tracking number is referred to herein as a "commit time" or system change number "SCN".

According to an embodiment of the invention, an SCN is a monotonically increasing number that increments each time a transaction commits. In this embodiment, the SCN corresponds to the relative ordering of commits by transactions rather than to the actual time of commit for each transaction. Thus, each transaction has a unique SCN which is ordered based upon the commit time of the transaction, with earlier committing transactions having lower SCNs later committing transactions. However, other methods of implementing commit times or SCNs can be utilized within the present invention, including numerical SCNs that correspond to the actual time of commit for transactions.

Row Level Dependency Tracking

According to an embodiment of the invention, all dependencies for a transaction can be characterized by a single value representing all prior transactions that it is dependent upon. This single value is referred to herein as a dependent SCN or "dep_SCN". The dep_SCN is determined by taking the maximum value of the SCNs for all transactions it is immediately dependent upon. The dep_SCN represents an ordering value that establishes the absolute latest commit time for prior transactions that a transaction is dependent upon.

To illustrate, assume that a transaction TXC is immediately dependent upon transactions TXA and TXB. Further assume that TXA has a SCN of 5 and TXB has a SCN of 10. The dep_SCN of transaction TXC would be 10, which is the maximum of 5 and 10. The significance of the dep_SCN value is that it can be used to presume that transaction TXC is not dependent upon any transactions having a SCN greater than 10. Thus, when ordering transactions, TXC can be placed earlier then or in parallel to any transactions having a SCN greater than 10.

With respect to all transactions that TXC is dependent upon, the dep_SCN value relieves the need to calculate and catalog every single prior transaction that it is dependent upon. Instead, it can be presumed that transaction TXC is dependent upon every transaction having a SCN of 10 or less. Thus, when ordering transactions, TXC is always placed later than any transactions having a SCN of 10 or less. In other words, transaction TXC is not executed unless all transactions having an SCN of 10 or less has already been processed and committed.

According to the invention, SCNs are increasing values that represent a natural ordering of transactions. A later committing transaction will have a higher SCN than an earlier committing transaction. If transaction TXC is dependent upon a prior transaction TXA having a given commit time t, then TXC is presumed to be dependent upon every other transaction equal to or earlier than commit time t. There is no need to calculate and determine the even earlier dependencies of transaction TXA, since it can be presumed that any such dependencies are earlier then the commit time t of transaction TXA. To ensure that all dependencies of a transaction are considered, the dep_SCN value uses the maximum commit time value for all of the transactions that it is dependent upon. This collapses the entire set of dependencies for a transaction into a single dep_SCN value.

Consistent with the invention, dep_SCN values are calculated based upon changes at the granularity level of the table row. To accomplish this type of dependency tracking at the row level, disclosed is a database structure that can be used to track the commit times associated with changes to each row of the database. As used herein, the commit time for a change to a database row is referred to a "row_SCN". Dependency tracking can therefore be performed at low granularity levels, since commit times are tracked at the row level. Thus, dep_SCN values are calculated based upon changes to rows (or combination of rows), rather than at coarser granularity levels such as the block level.

One implementation of the invention adds a structure to each row that is capable of holding a row_SCN value associated with each row (e.g., by adding to the head piece of a table row). This new structure comprises an additional column (whether hidden or visible to users) that is capable of storing one or more row_SCN values corresponding to that row. According to an embodiment, if a transaction affects a row, then the commit time of that transaction becomes the row_SCN value for that row. If a transaction affects multiple rows during the course of its processing, then the row_SCN for all the affected rows is the same (which constitutes the SCN of the common transaction).

The calculation of a dep_SCN value at row level granularities can be determined based upon the row_SCN values of the rows affected by a particular transaction. In an embodiment, the dep_SCN value at row level granularities for a transaction TRX is determined as follows:

dep_SCN=MAX(row_SCN of all rows affected by TRX)

For the purposes of illustration, consider the following sequence of transactions which executes the indicated database statements (in SQL-based pseudocode) against a database table "Emp_Table" having the structure Emp_Table (emp_name, emp_value):

At commit time 5—Transaction T1 commits having executed the following statement:
INSERT INTO Emp_Table VALUES ('Smith', X);
At commit time 10—Transaction T2 commits having executed the following statement:
INSERT INTO Emp_Table VALUES ('Jones', Y);
At commit time 15—Transaction T3 commits having executed the following statements:
UPDATE Emp_Table SET Emp_value=X+1 WHERE emp_name='Smith';
UPDATE Emp_Table SET Emp_value=Y+1 WHERE emp_name='Jones';
At commit time 20—Transaction T4 commits having executed the following statement:
INSERT INTO Emp_Table VALUES ('Miller', Z);
At commit time 25—Transaction T5 commits having executed the following statements:
UPDATE Emp_Table SET Emp_value=Emp_value+1 WHERE emp_name='Smith';
DELETE FROM Emp_Table WHERE emp_name='Miller';

At commit time 5, transaction T1 commits having inserted a row into the table Emp_Table, with the value "Smith" in the emp_name column of that row and the value "X" in the emp_value column of that row. At commit time 10, transaction T2 commits having inserted a row into the table Emp_Table, with the value "Jones" in the emp_name column of that row and the value "Y" in the emp_value column of that row. At commit time 15, transaction T3 commits which modifies the "Smith" row to change the emp_value column of the row to "X+1". Transaction T3 also modifies the "Jones" row to change the emp_value column of the row to "Y+1". At commit time 20, transaction T4 commits which has inserted a row into the table Emp_Table, with the value "Miller" in the emp_name column of that row and the value "Z" in the emp_value column of that row. At commit time 25, transaction T5 commits which modifies the "Smith" row to change the emp_value column of the row to "X+2". Transaction T5 also deletes the "Miller" row that was inserted by transaction T4.

Figure 2:
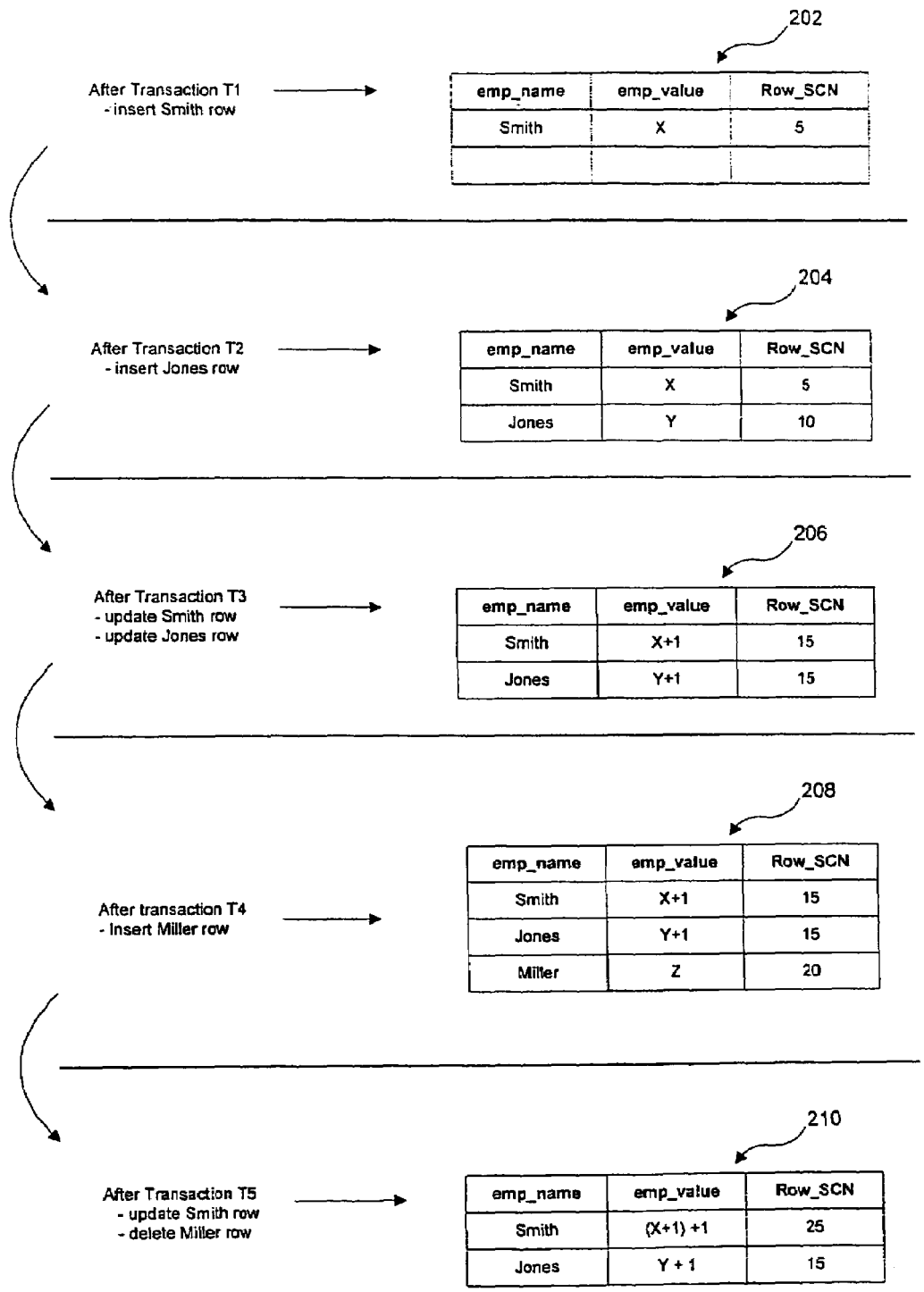
FIG. 2 depicts changes to a database table as the example sequence of database statements are applied.

With respect to the above example sequence of transactions T1-T5, FIGS. 2 and 3 illustrate the application of this embodiment of the invention. FIG. 2 illustrates changes to the Emp_Table as the sequence of transactions T1-T5 are performed and committed. FIG. 3 describes the calculation of dep_SCN values at row level granularities for each of the transactions T1 through T5.

Note that in this example, transaction T1 commits at commit time 5 having executed the following statement:
INSERT INTO Emp_Table VALUES ('Smith', X);
Since this transaction consists of an INSERT statement, it is not dependent upon any other transaction. Thus, the dep_SCN value for any rows affected by this transaction is set to a value that indicates no dependencies, which is equal to "0" in the present embodiment. The row-based commit time for all rows affected by this transaction is 5, which is the commit time of the transaction. Dependent SCN Table 300 in FIG. 3 is used to demonstrate the tracking of dep_SCN values. Row 302 in the Dependent SCN Table 300 shows, in the dep_SCN column 312, that the dep_SCN for transaction T1 has been set to "0". Table 202 in FIG. 2 illustrates the Emp_Table after transaction T1 has committed. Transaction T1 inserts a new "Smith" row to table Emp_Table, with the value "Smith" in the emp_name column and "X" in the emp_value column of the new row. Since the present embodiment of the invention tracks dependencies at the granularity of the row level, the "Smith" row also includes a row_SCN value of "5", which is the commit time of transaction T1.

Structures in FIGS. 2 and 3 are shown for purposes of illustration only, to help illustrate the changes to the dep_SCN value and row_SCN values as transactions T1 through T5 are executed. It is understood, however, that the choice of storage locations and format for these commit time values are subject to many design variables and may be stored in numerous locations or formats; thus, the exact storage locations and format shown for these commit time values do not form a necessary limitation to the invention.

In a similar manner to transaction T1, transaction T2 having a commit time of 10 executes the following statement:
    INSERT INTO Emp_Table VALUES ('Jones', Y);

Table 204 in FIG. 2 illustrates Emp_Table after transaction T2 has committed. Similar to transaction T1, T2 inserts a new row into Emp_Table having the "Jones" and "Y" values in the emp_name and emp_value columns, respectively. The row_SCN value for any row affected by T2, including the new "Jones" row, is 10, which is the commit time of transaction T2. Since this transaction executes an insert statement, it is not dependent upon any previous transactions; thus, the dep_SCN for the inserted row has a value of "0". This is the same dep_SCN as the "Smith" row, even though the row_SCN associated with the "Jones" row is higher than the row_SCN of the "Smith" row. Therefore, despite their row_SCN values, it can be seen that neither row is dependent upon the other, and can be ordered entirely independent of the other. The dependent commit time value for rows affected by transaction T2 are shown in row 304 of FIG. 3.

Transaction T3 commits at time 15 having executed the following statements:
    UPDATE Emp_Table SET Emp_value=X+1 WHERE emp_name='Smith';
    UPDATE Emp_Table SET Emp_value=Y+1 WHERE emp_name='Jones';

According to an embodiment, the dep_SCN value for this transaction is calculated by determining the maximum of the row_SCN values for all rows that it affects. Since T3 directly affects the "Smith" and "Jones" rows, the dep_SCN for transaction T3 is:
    dep_SCN of T3=MAX(row_SCNs of all rows affected by T3)=MAX(row_SCN of "Smith" row, row_SCN of "Jones" row)=MAX(5, 10)=10

Thus, row 306 of the Dependent SCN Table 300 in FIG. 3 shows that the dep_SCN of transaction T3 is 10. Since transaction T3 commits at commit time 15, all rows affected by this transaction has a new row_SCN of "15". Table 206 in FIG. 2 reflects the state of table Emp_Table after transaction T3 has committed, including an update to the row_SCN value for each row modified by T3.

In a similar manner to transactions T1 and T2, transaction T3 having a commit time of 20 executes the following statement:
    INSERT INTO Emp_Table VALUES ('Miller', Z);

Table 208 in FIG. 2 illustrates Emp_Table after transaction T4 has committed. Similar to transactions T1 and T2, T4 inserts a new row into Emp_Table having the "Miller" and "Z" values in the emp_name and emp_value columns, respectively. The row_SCN value for any row affected by T2, including the new "Miller" row, is 20, which is the commit time of transaction T4. Since this transaction executes an insert statement, it is not dependent upon any previous transactions; thus, the dep_SCN for the inserted row has a value of "0", which is the same dep_SCN as the rows inserted by transactions T1 and T2. The dep_SCN value for rows affected by transaction T4 is shown in row 308 of FIG. 3.

Transaction T5 commits at time 25 having executed the following statements:
    UPDATE Emp_Table SET Emp_value=Emp_value+1 WHERE emp_name='Smith';
    DELETE FROM Emp_Table WHERE emp_name='Miller';

Transaction T5 is dependent upon all prior transactions T1–T4 since it modifies rows affected by these prior transactions. However, it is directly dependent upon transactions T3 and T4 (as seen from FIG. 1), since it directly modifies or deletes rows last affected by these transactions. The dep_SCN for transaction T5 is therefore:
    dep_SCN of T5=MAX(row_SCNs of all rows directly affected by T5)=MAX(row_SCN of "Smith" row, row_SCN of "Miller" row)=MAX(15, 20)=20

As shown in row 310 of the Dependent SCN Table 300, the dep_SCN of transaction T5 is 20. Since transaction T5 has a commit time of 25, all rows affected by T5 that still exist have a new row_SCN equal to "25". Table 206 in FIG. 2 reflects the state of table Emp_Table after transaction T5 has committed, including an update to the row_SCN value for each row modified by T5.

Figure 4:
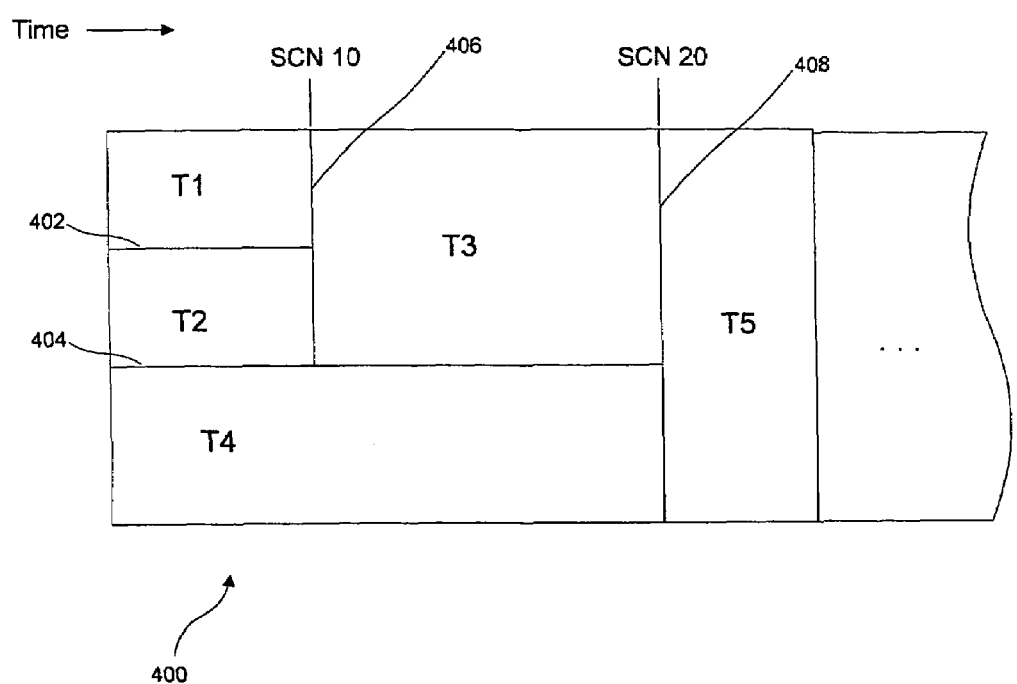
FIG. 4 shows a scheduling plan corresponding to the transactions of FIG. 3.

The dependency ordering of transactions can be established once the dep_SCN for transactions have been determined. FIG. 4 illustrates an ordering schedule for transactions T1–T5 based upon the analysis of dep_SCNs as shown in FIG. 3. In FIG. 4, the ordering schedule proceeds from left to right, with required ordering of transactions indicated by vertical bars between transactions. Transactions that are permitted to run in parallel or earlier than each other (i.e., are not dependent upon each other) are separated by horizontal bars. Since transactions T1, T2, and T4 all have the same dependent SCN of "0", these transactions are not dependent upon any earlier transactions, and can be ordered before or parallel to any other transaction subject to the ordering/dependency constraints of any later transactions. Thus, these three transactions are configured in parallel separated by horizontal bars 402 and 404.

Transaction T3 has a dep_SCN value of 10; therefore, T3 must be scheduled to begin after all other transactions having SCN values of 10 or less. Vertical bar 406 representing a SCN of 10 is shown in ordering schedule 400 separating transaction T3 from all prior transactions having a SCN of 10 or less (transactions T1 and T2 in this example have SCN values of 10 or less). Since transaction T4 has a SCN higher than 10, transaction T3 is permitted to run in parallel with T4 (shown separated with horizontal bar 404). Transaction T5 has a dep_SCN value of 20; therefore, T5 must be scheduled to begin after all other transactions having SCN values of 20 or less. Thus, vertical bar 408 representing a SCN of 20 in ordering schedule 400 separates T5 from all prior transactions having a SCN of 20 or less.

To rephrase the significance of FIG. 4, the dep_SCN values for each transaction has been used to provide a scheduling order for the application of each transaction T1–T5. Since the dep_SCN values were calculated upon SCN values stored for reach row, the granularity of the dependency tracking used for the scheduling order is on the row level. Based upon analysis of the dep_SCN values, it can be seen that transactions T1, T2, and T3 can each be scheduled independent of the other, and even scheduled in parallel. Transaction T3 must be scheduled after transactions T1 and T2 have committed, but may be scheduled in parallel with transaction T4. And finally, transaction T5 must be scheduled after all other transactions T1–T4 have committed.

FIG. 1 maps the tree of dependencies for these transactions, which is an alternate method of representing FIG. 4. Since transaction T3 can be applied only if transactions T1 and T2 have already been committed. Node T3 is shown as a child to parent nodes T1 and T2. Transaction T5 is dependent upon all the other transactions since it is modifying or deleting rows in a manner that relies upon actions that have previously been taken by transactions T1–T4. Transaction T5 is directly dependent upon transaction T4 since transaction T5 is deleting the "Miller" row, which exists only if transaction T4 has been executed and committed. Thus, T5 is shown as a child node to node T4. Transaction T5 is dependent upon transaction T3 since transaction T5 is updating the "Smith" row in a manner that relies upon the prior update made by transaction T3. Node T5 is therefore also shown as a child node to T3. Since transaction T3 is dependent upon transactions T1 and T2, then through T3, transaction T5 is also dependent upon transactions T1 and T2. Transactions T1, T2, and T4 do not rely upon actions taken by any previous transactions. Therefore, these nodes are shown without any parent nodes.

Figure 5:
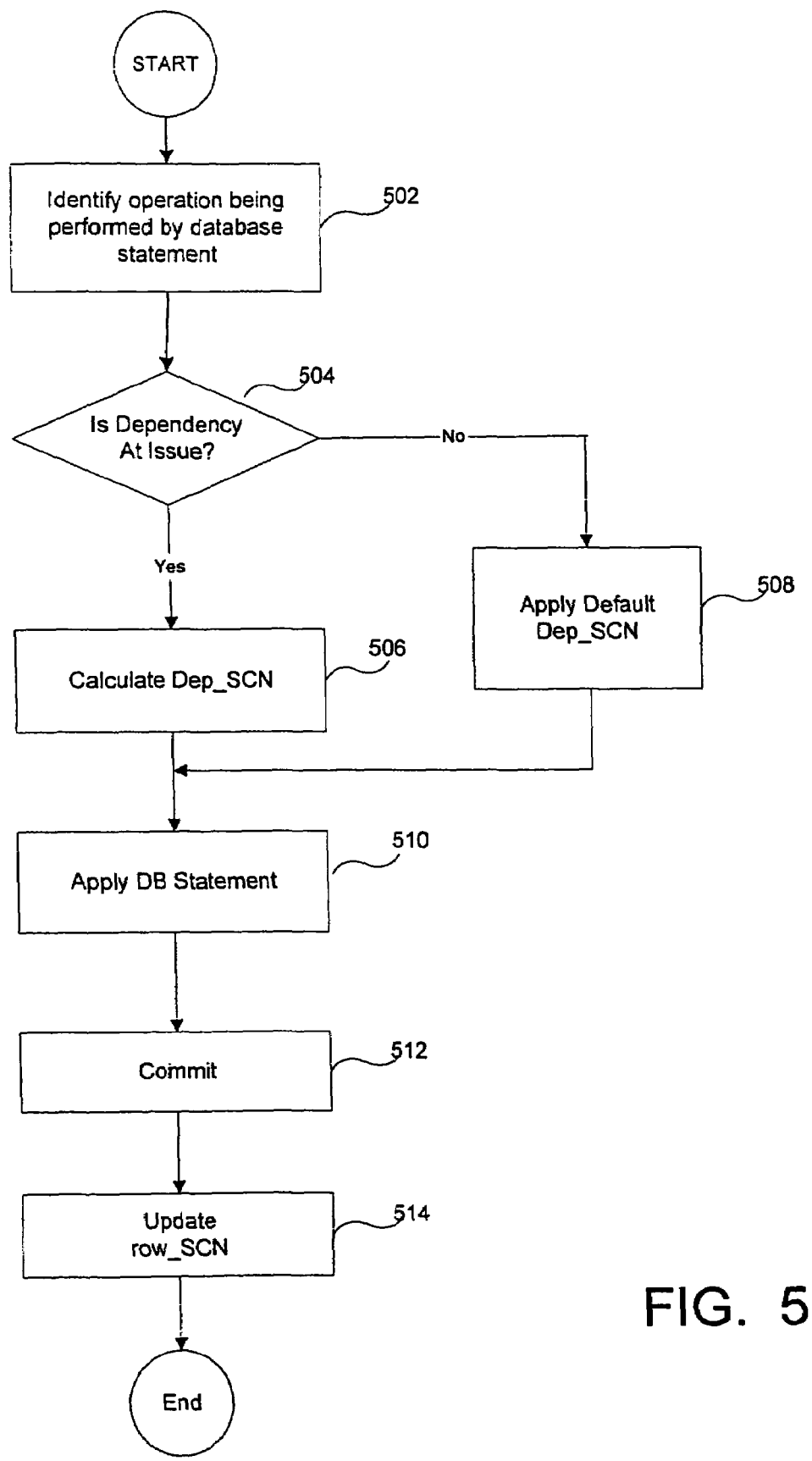
FIG. 5 shows a process flowchart of an embodiment of the invention.

FIG. 5 depicts a flowchart of a process for dependency tracking according to an embodiment of the present invention. At 502, identification is made of the particular operation being performed by a database statement. According to an embodiment, dependency tracking can be made at the operation level, with certain kinds of data operations having dependency significance that is different than other kinds of data operations. Consistent with this embodiment, the following are examples of operations along with their dependency significance:

a. Insert operation: This operation is not dependent any prior operations; therefore, insert operations result in a default dep_SCN value for inserted rows to reflect no dependencies.
 b. Query operation: For systems that do not replicate queries, this operation does not cause any dependencies to occur, therefore does not affect a row_SCN. If queries are replicated, e.g., in a system having operation or function replication in addition to data replication, then query operations could be dependent upon prior changes made to a row value; therefore, need to calculate a dep_SCN.
 c. Update operation: Update operations are dependent upon prior insertions and changes made to row values; therefore, need to calculate dep_SCN.
 d. Delete operation: Delete operations are dependent upon prior insertion of a row; therefore, need to calculate dep_SCN.
 e. Physical property changes: In the present embodiment, physical characteristics of a data object, e.g., the specific block that an object is stored in, do not cause dependencies.

At 504, the type of operation being performed by a statement is considered in determining the dep_SCN calculation. If the operation has no dependencies (e.g., INSERT statement), then a default value is assigned to the dep_SCN indicating no dependencies (508). Otherwise, a dependency calculation is performed to determine the dependent SCN for a transaction (506). The dep_SCN value may be obtained by taking the maximum value for all the row_SCNs affected (either directly or indirectly) by the transaction. The database statement can thereafter be applied (510) and the transaction committed (512).

According to an embodiment of the invention, the row_SCN value is stored in a head piece that is added to a table row. This portion of the row can be considered a "hidden" column that stores information that is internally usable by the database system. When the row is not locked by a transaction, this row_SCN holds the commit time of the transaction that last modified the row. When a row is marked as locked, the row_SCN could be stored in a lock structure, and is configured to store the commit time of the last modifier of the row. If there is no row_SCN value in the lock structure, the transaction may be active so the row_SCN in the row may be employed for dep_SCN calculations. When a new row is inserted into a table, the row_SCN of that row is the commit time of the transaction that performed the insert operation and the dep_SCN value is initialized to zero.

According to an embodiment, the commit of a transaction does not automatically cause the row_SCN of a row to be updated with the commit time of the transaction. Instead, a delayed logging cleanout operation is performed that does not propagate the commit time to each affected row. According to this embodiment, a lock on a row is not automatically released once a transaction commits. Instead, the lock is cleaned out "on-demand" when a later transaction is interested in taking a lock to that row. Only at that later point in time, when the lock is cleared out for a particular row, is the row_SCN for that row updated with the commit time of the last transaction that has operated upon the row and committed (514). That same commit time is copied to the row_SCN for all rows affected by that previous transaction. In an alternate embodiment, the row_SCN of a row is updated as soon as the transaction operating upon that row commits, without waiting for a later transaction to clean out the locks.

This invention can be utilized to implement scalable replication in a database system. Replication is the process of copying and maintaining database objects such that information at a local database is replicated to a remote database. Many advantages exist to having a replicated database system. For example, replication can improve the performance and protect the availability of applications because of the existence of alternate data access sites. An application may normally access a local database rather than a remote server to minimize network traffic and achieve maximum performance.

Consider a replication system that operates by propagating all changes at a local database to remote database sites. The changes are then applied at the remote sites to maintain correspondence between the state of the remote database and the state of the local database. As changes are performed to the local database site, the changes are queued for transmission to the remote sites. Under certain circumstances, it may be desirable to transmit these changes out-of-order to the remote sites, possibly to maximize network bandwidth usage by transmitting various changes in parallel. With the present invention, the type of scheduling plan as represented in FIG. 4 can be utilized to determine which changes can be transmitted in parallel without violating dependencies between the changes. If the unit of change utilized is the transaction, then the present invention can be used to determine the order in which transactions can be propagated and applied at remote site in a replicated system. Alternatively, the transactions themselves can be propagated in any contemplated order necessary to minimize network usage, but once the changes have actually been received by the remote sites, a scheduling plan may be used to re-apply the changes in the correct order at the remote sites.

Replication is merely one example of a procedure in which the present invention may be applied. The present method and mechanism for dependency tracking can also be utilized for improved optimistic locking. With optimistic locking, data items accessed and retrieved by a first user are not immediately placed in an exclusive lock with respect to other users. This allows greater concurrency in the system since other users are not blocked from simultaneous access to that data item. However, this may also allow other users to independently modify that data item after a version of the data item has been retrieved by the first user, thereby rendering the copy of the data item held by the first user invalid or "stale".

According to the present invention, the row_SCN value associated with a row in the database can be utilized to determine whether a data item has been modified by another user. When the first user is ready to act upon a data item (e.g., a "modify" operation), the row_SCN value(s) for that data item is checked to determine whether the data item has been modified after the original retrieval time by the first user. If the row_SCN value(s) is more recent than the SCN corresponding to the original retrieval time, then another user has modified that data item and the first user must obtain the most recent version of the data item before proceeding. If the row_SCN values(s) is equal or less than the original retrieval time by the first user, this indicates that another user did not recently modify the data item and the planned operation can proceed without worry of data inconsistency.

As another example, the present invention can also be used for improved data caching to more efficiently identify stale data items in cache. Row_SCN values for data items in cache can be checked to determine whether the data versions in cache accurately reflect the most recent changes to those data items. According to an embodiment, the data cache is associated with a cache SCN value corresponding to the last point in time in which the data cache was updated with the most recent versions of data items maintained in that cache. At a later point in time, the row_SCN values for data items in cache are matched against the cache SCN. If the row_SCN value for a data item is less than or equal to the cache SCN, then that data item did not change and the cache contains the latest version of that data item. If the row_SCN value for a data item is greater than the cache SCN, then the cache does not contain the most recent version of that data item and should be updated to become current. Once the updates for all data items have completed, the cache SCN value is updated to reflect the SCN at which the cache refresh operation occurred. Note that this operation can be performed periodically to ensure that the recent versions of data items are maintained in cache. This operation can also be performed upon access to a particular data item in cache.

System Architecture Overview

Figure 6:
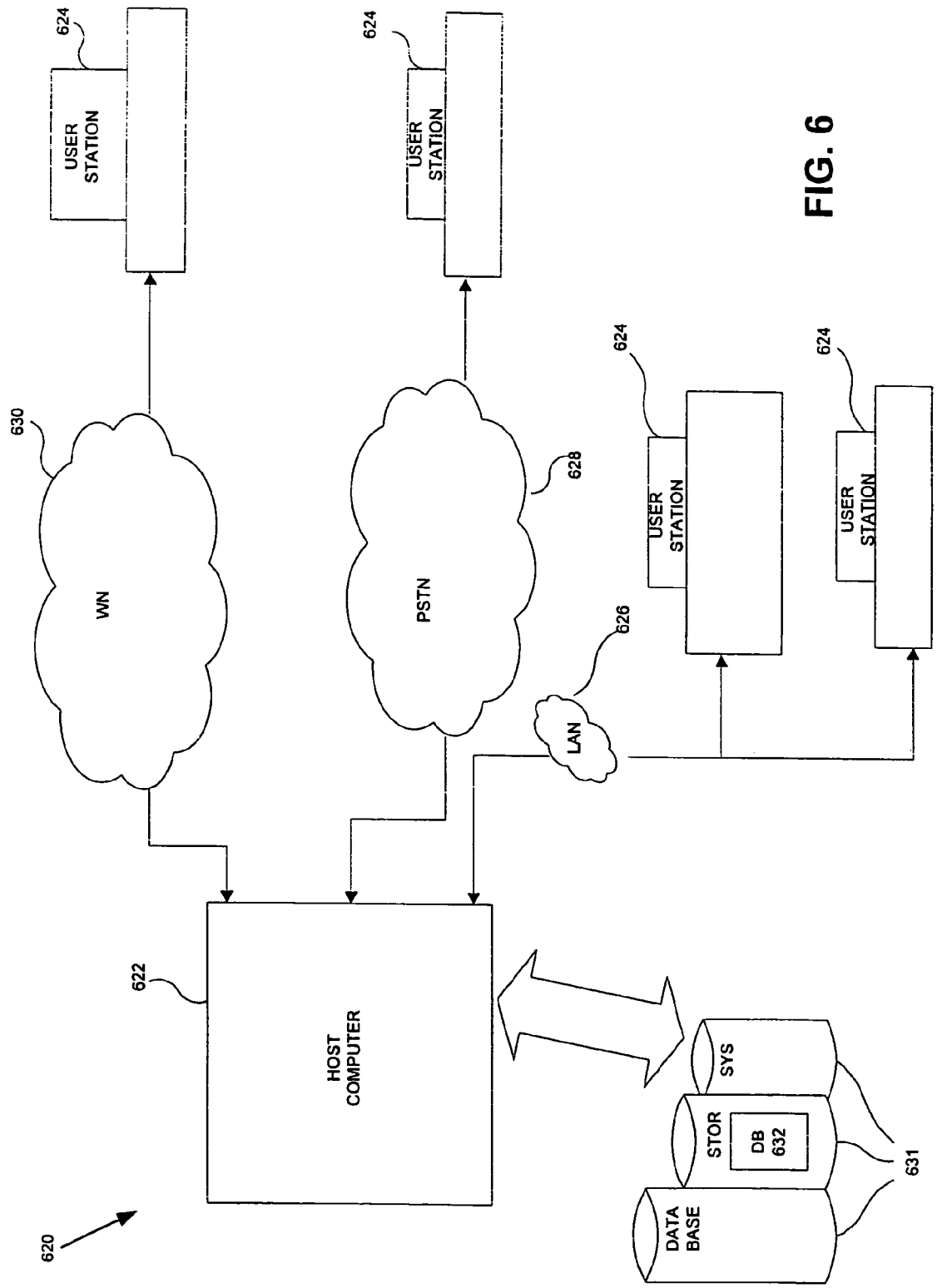
FIG. 6 is a diagram of a system architecture with which the present invention can be implemented.

Referring to FIG. 6, in an embodiment, a computer system 620 includes a host computer 622 connected to a plurality of individual user stations 624. In an embodiment, the user stations 624 each comprise suitable data terminals, for example, but not limited to, e.g., personal computers, portable laptop computers, or personal data assistants ("PDAs"), which can store and independently run one or more applications, i.e., programs. For purposes of illustration, some of the user stations 624 are connected to the host computer 622 via a local area network ("LAN") 626. Other user stations 624 are remotely connected to the host computer 622 via a public telephone switched network ("PSTN") 628 and/or a wireless network 630.

In an embodiment, the host computer 622 operates in conjunction with a data storage system 631, wherein the data storage system 631 contains a database 632 that is readily accessible by the host computer 622.

In alternative embodiments, the database 632 may be resident on the host computer, stored, e.g., in the host computer's ROM, PROM, EPROM, or any other memory chip, and/or its hard disk. In yet alternative embodiments, the database 632 may be read by the host computer 622 from one or more floppy disks, flexible disks, magnetic tapes, any other magnetic medium, CD-ROMs, any other optical medium, punchcards, papertape, or any other physical medium with patterns of holes, or any other medium from which a computer can read.

In an alternative embodiment, the host computer 622 can access two or more databases 632, stored in a variety of mediums, as previously discussed.

Figure 7:
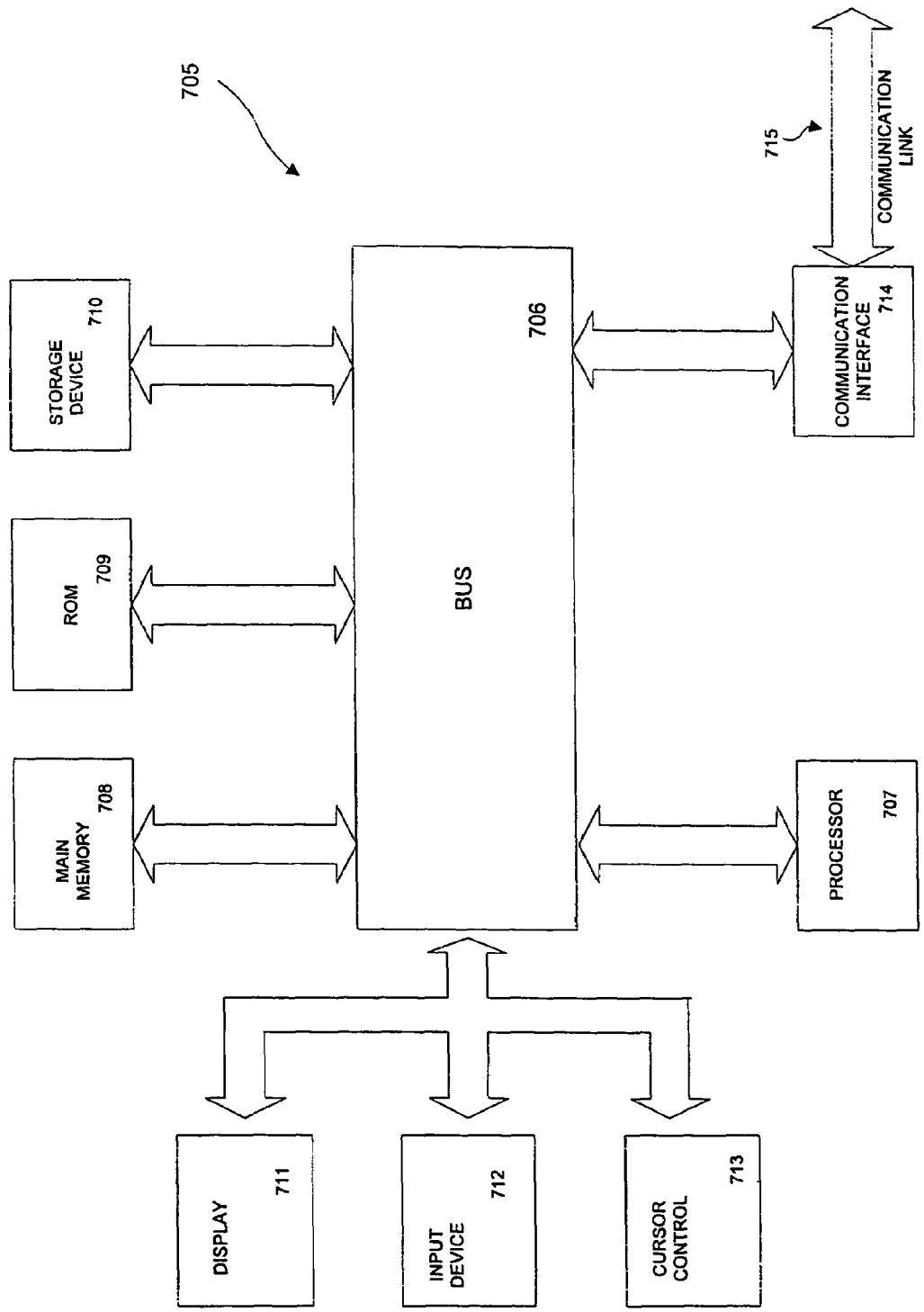
FIG. 7 is an additional diagram of a system architecture with which the present invention can be implemented.

Referring to FIG. 7, in an embodiment, each user station 624 and the host computer 622, each referred to generally as a processing unit, embodies a general architecture 705. A processing unit includes a bus 706 or other communication mechanism for communicating instructions, messages and data, collectively, information, and one or more processors 707 coupled with the bus 706 for processing information. A processing unit also includes a main memory 708, such as a random access memory (RAM) or other dynamic storage device, coupled to the bus 706 for storing dynamic data and instructions to be executed by the processor(s) 707. The main memory 708 also may be used for storing temporary data, i.e., variables, or other intermediate information during execution of instructions by the processor(s) 707.

A processing unit may further include a read only memory (ROM) 709 or other static storage device coupled to the bus 706 for storing static data and instructions for the processor(s) 707. A storage device 710, such as a magnetic disk or optical disk, may also be provided and coupled to the bus 706 for storing data and instructions for the processor(s) 707.

A processing unit may be coupled via the bus 706 to a display device 711, such as, but not limited to, a cathode ray tube (CRT), for displaying information to a user. An input device 712, including alphanumeric and other keys, is coupled to the bus 706 for communicating information and command selections to the processor(s) 707. Another type of user input device may include a cursor control 713, such as, but not limited to, a mouse, a trackball, a fingerpad, or cursor direction keys, for communicating direction information and command selections to the processor(s) 707 and for controlling cursor movement on the display 711.

According to one embodiment of the invention, the individual processing units perform specific operations by their respective processor(s) 707 executing one or more sequences of one or more instructions contained in the main memory 708. Such instructions may be read into the main memory 708 from another computer-usable medium, such as the ROM 709 or the storage device 710. Execution of the sequences of instructions contained in the main memory 708 causes the processor(s) 707 to perform the processes described herein. In alternative embodiments, hard-wired circuitry may be used in place of or in combination with software instructions to implement the invention. Thus, embodiments of the invention are not limited to any specific combination of hardware circuitry and/or software.

The term "computer-usable medium," as used herein, refers to any medium that provides information or is usable by the processor(s) 707. Such a medium may take many forms, including, but not limited to, non-volatile, volatile and transmission media. Non-volatile media, i.e., media that can retain information in the absence of power, includes the ROM 709. Volatile media, i.e., media that can not retain information in the absence of power, includes the main memory 708. Transmission media includes coaxial cables, copper wire and fiber optics, including the wires that comprise the bus 706. Transmission media can also take the form of carrier waves; i.e., electromagnetic waves that can be modulated, as in frequency, amplitude or phase, to transmit information signals. Additionally, transmission media can take the form of acoustic or light waves, such as those generated during radio wave and infrared data communications.

Common forms of computer-usable media include, for example: a floppy disk, flexible disk, hard disk, magnetic tape, any other magnetic medium, CD-ROM, any other optical medium, punchcards, papertape, any other physical medium with patterns of holes, RAM, ROM, PROM (i.e., programmable read only memory), EPROM (i.e., erasable programmable read only memory), including FLASH-EPROM, any other memory chip or cartridge, carrier waves, or any other medium from which a processor 707 can retrieve information.

Various forms of computer-usable media may be involved in providing one or more sequences of one or more instructions to the processor(s) 707 for execution. For example, the instructions may initially be provided on a magnetic disk of a remote computer (not shown). The remote computer may load the instructions into its dynamic memory and then transit them over a telephone line, using a modem. A modem local to the processing unit may receive the instructions on a telephone line and use an infrared transmitter to convert the instruction signals transmitted over the telephone line to corresponding infrared signals. An infrared detector (not shown) coupled to the bus 706 may receive the infrared signals and place the instructions therein on the bus 706. The bus 706 may carry the instructions to the main memory 708, from which the processor(s) 707 thereafter retrieves and executes the instructions. The instructions received by the main memory 708 may optionally be stored on the storage device 710, either before or after their execution by the processor(s) 707.

Each processing unit may also include a communication interface 714 coupled to the bus 706. The communication interface 714 provides two-way communication between the respective user stations 624 and the host computer 622. The communication interface 714 of a respective processing unit transmits and receives electrical, electromagnetic or optical signals that include data streams representing various types of information, including instructions, messages and data.

A communication link 715 links a respective user station 624 and a host computer 622. The communication link 715 may be a LAN 626, in which case the communication interface 714 may be a LAN card. Alternatively, the communication link 715 may be a PSTN 628, in which case the communication interface 714 may be an integrated services digital network (ISDN) card or a modem. Also, as a further alternative, the communication link 715 may be a wireless network 630.

A processing unit may transmit and receive messages, data, and instructions, including program, i.e., application, code, through its respective communication link 715 and communication interface 714. Received program code may be executed by the respective processor(s) 707 as it is received, and/or stored in the storage device 710, or other associated non-volatile media, for later execution. In this manner, a processing unit may receive messages, data and/or program code in the form of a carrier wave.

In the foregoing specification, the invention has been described with reference to specific embodiments thereof. It will, however, be evident that various modifications and changes may be made thereto without departing from the broader spirit and scope of the invention. For example, the reader is to understand that the specific ordering and combination of process actions shown in the process flow diagrams described herein is merely illustrative, and the invention can be performed using different or additional process actions, or a different combination or ordering of process actions. The specification and drawings are, accordingly, to be regarded in an illustrative rather than restrictive sense.

We claim:

1. A computer implemented process for tracking dependencies in a database system comprising:
   tracking a first row commit time for a first row in a database system, said first row commit time corresponding to a prior commit of an operation performed against said first row;
   executing a database change relating to said first row;
   determining a dependency value for said database change based upon said first row commit time;
   tracking a second row commit time for a second row in said database system, said second row commit time corresponding to a prior commit of an operation performed against said second row;
   executing a second database change against said second row;
   determining said dependency value by computing the maximum of either said first row commit time or said second row commit time; and
   wherein the first row commit time and second row commit time are tracked at a granularity that is smaller than a transaction.

2. The process of claim 1 in which said dependency value comprises a commit time value computed from said first commit time, said database change is considered to be dependent upon all prior database changes which commit at or earlier than said dependency value.

3. The process of claim 1 in which said dependency value comprises a commit time value computed from said first commit time, said database change is considered not to be dependent upon other database changes which commit later than said dependency value.

4. The process of claim 1 in which said database change is a transaction.

5. The process of claim 1 further comprising:
   generating an ordering schedule for multiple changes to said database based upon said dependency value.

6. The process of claim 5 in which said ordering schedule is used to propagate changes to replicated database sites.

7. A computer program product that includes a computer-usable medium having a sequence of instructions which, when executed by a processing system, causes the system to execute a process for tracking dependencies in a database system, the process comprising:
- tracking a first row commit time for a first row in a database system, said first row commit time corresponding to a prior commit of an operation performed against said first row;
- executing a database change relating to said first row;
- determining a dependency value for said database change based upon said first row commit time;
- tracking a second row commit time for a second row in said database system, said second row commit time corresponding to a prior commit of an operation performed against said second row;
- executing a second database change against said second row;
- determining said dependency value by computing the maximum of either said first row commit time or said second row commit time; and
- wherein the first row commit time and second row commit time are tracked at a granularity that is smaller than a transaction.

8. The computer program product of claim 7 in which said dependency value comprises a commit time value computed from said first commit time, said database change is considered to be dependent upon all prior database changes which commit at or earlier than said dependency value.

9. The computer program product of claim 7 in which said dependency value comprises a commit time value computed from said first commit time, said database change is considered not to be dependent upon other database changes which commit later than said dependency value.

10. The computer program product of claim 7 in which said database change is a transaction.

11. The computer program product of claim 7, the process further comprising:
- generating an ordering schedule for multiple changes to said database based upon said dependency value.

12. The computer program product of claim 11, in which said ordering schedule is used to propagate changes to replicated database sites.

13. A computer implemented system for tracking dependencies in a database system comprising:
- means for tracking a first row commit time for a first row in a database system, said first row commit time corresponding to a prior commit of an operation performed against said first row;
- means for executing a database change relating to said first row;
- means for determining a dependency value for said database change based upon said first row commit time;
- tracking a second row commit time for a second row in said database system, said second row commit time corresponding to a prior commit of an operation performed against said second row;
- executing a second database change against said second row;
- determining said dependency value by computing the maximum of either said first row commit time or said second row commit time; and
- wherein the first row commit time and second row commit time are tracked at a granularity that is smaller than a transaction.

14. The system of claim 13 in which said dependency value comprises a commit time value computed from said first commit time, said database change is considered to be dependent upon all prior database changes which commit at or earlier than said dependency value.

15. The system of claim 13 in which said dependency value comprises a commit time value computed from said first commit time, said database change is considered not to be dependent upon other database changes which commit later than said dependency value.

16. The system of claim 13 in which said database change is a transaction.

17. The system of claim 13, further comprising:
- means for generating an ordinary schedule for multiple changes to said database based upon said dependency value.

18. The system of claim 13, in which said ordering schedule is used to propagate changes to replicated database sites.

* * * * *